United States Patent [19]
Ohkawa

[11] Patent Number: 5,526,909
[45] Date of Patent: Jun. 18, 1996

[54] PARKING MECHANISM FOR AUTOMATIC TRANSMISSION

[75] Inventor: Yuzo Ohkawa, Higashihiroshima, Japan

[73] Assignee: Mazda Motor Corporation, Hiroshima-ken, Japan

[21] Appl. No.: 171,357

[22] Filed: Dec. 23, 1993

[30] Foreign Application Priority Data

Dec. 24, 1992 [JP] Japan .................. 4-344027

[51] Int. Cl.⁶ .................................................. B60K 41/26
[52] U.S. Cl. ...................... 192/4 A; 192/4 C; 74/470
[58] Field of Search ........................ 192/4 A, 4 C; 74/470, 575, 577 R

[56] References Cited

U.S. PATENT DOCUMENTS

| | | | |
|---|---|---|---|
| 4,671,133 | 6/1987 | Yamada | 192/4 A X |
| 4,719,999 | 1/1988 | Ohkubo | 192/4 A |
| 4,907,681 | 3/1990 | Kuusik et al. | 192/4 A |
| 5,170,869 | 12/1992 | Svab et al. | 192/4 A |
| 5,295,412 | 3/1994 | Donato et al. | 192/4 A |

FOREIGN PATENT DOCUMENTS 57-173652  10/1982  Japan .

*Primary Examiner*—Andrea L. Pitts
*Attorney, Agent, or Firm*—Keck, Mahin & Cate

[57] ABSTRACT

An automatic transmission parking mechanism, having an anchor arm with a pawl which is engaged and disengaged with a transmission shaft by an actuator so as to disable the shaft to rotate and enable rotation of the shaft, includes a restraint member for restraining the actuator to move beyond a predetermined extent which is essential to bring the anchor arm into engagement with the shaft, and a slip mechanism for allowing slippage between a range selection member and the actuator during a restraint of the actuator.

20 Claims, 4 Drawing Sheets

PARKING MECHANISM FOR AUTOMATIC TRANSMISSION

BACKGROUND OF THE INVENTION

1. Field of the Invention

This invention relates to an automatic transmission for automobiles, and, more particularly, to a parking mechanism of an automatic transmission which ensures reliable parking operation and light releasing operation of a parking range.

2. Description of Related Art

Typically, automatic transmissions for automobiles have, as their transmission means, planetary gear mechanisms or infinitely variable gear mechanisms. Such an automatic transmission is selected and placed into any desired ranges, such as forward ranges, a reverse range, a neutral range and a parking range, by means of a select or shift lever directly operated by a driver. A selection of the parking range causes a parking mechanism to lock a transmission shaft of the automatic transmission. Such a parking mechanism installed in, for instance, an automatic transmission of the type having juxtaposed transmission shafts, includes a parking gear fixedly mounted on one of the transmission shafts, to which a secondary pulley is attached and which is called a secondary transmission shaft, and a parking anchor arm with a pawl. The parking mechanism forces the parking anchor arm to bring the pawl into engagement with the parking gear, by means of which the secondary transmission shaft is mechanically locked. Such a parking mechanism is known from, for instance, Japanese Unexamined Patent Publication No.57-173652.

In automatic transmissions of the type having a long linkage path between the shift lever to the parking anchor arm, various structural elements or parts for the parking mechanism are typically arranged in the linkage path. Consequently, among mass-produced automatic transmissions, parking anchor arms are apt to have variations in stroke or angle of swinging movement due to an accumulation of allowable dimensional errors of these elements. If in fact the parking anchor arm has a large stroke or angle of swinging movement, the parking mechanism provides, on one hand, a reliable operation for a selection of the parking range and, on the other hand, requires a large operational force for releasing the parking range. In contradistinction to this, if the parking anchor arm has a small stroke or angle of swinging movement, the parking anchor arm is subjected to a large reaction force from the parking gear and consequently, accidentally allows the pawl easily disengage from the parking gear. Further, the arrangement of these structural elements in the linkage path requires a large space in an automatic transmission housing, this leads to a bulky configuration of the automatic transmission.

SUMMARY OF THE INVENTION

It is therefore an object of the present invention to provide an automatic transmission in which a parking mechanism provides a reliable operation for a parking range selection and an easy and light operation of releasing of a parking range even if a parking anchor arm has a large allowable error in stroke or angle of swinging movement.

It is another object of the present invention to provide an automatic transmission in which what is called a "dead space" within a transmission housing is effectively utilized to arrange structural elements or parts of and related to a parking mechanism and which is made compact in overall configuration.

These object of the present invention are achieved by providing a parking mechanism for an automatic transmission having an input shaft and an output shaft placed in parallel. The parking mechanism includes an actuator means disposed on one side of the input shaft close to the output shaft for bringing a pawl means into engagement with the output shaft upon a selection of a parking range by a range selection means linked to the actuator means. The parking mechanism further includes a restraint means is provided so as to restrain a pivotal movement of the actuator means beyond a predetermined extent which is essential to bring the pawl meas into engagement with the output shaft, and a slip means disposed between the linking means and the actuator means for allowing slippage of the linking means relative to the actuator means during a restraint of the actuator means by the restraint means.

With the parking mechanism for an automatic transmission in accordance with the present invention, in disregard of operational variations in stroke with which the linking means, such as a parking shift tie rod, moves, if the range selection means and elements or parts related to and cooperating with it have large cumulative allowable errors and when the parking shift tie rod actually moves with the minimum stroke, the slip means operates as one whole without allowing relative slippage or displacement between the actuator means and the link means. On the other hand, when it moves over the minimum stroke, the slip means allows relative slippage or displacement between the actuator means and the link means. This results in that when the linking means moves only with the minimum stroke, the actuator means brings the pawl means into engagement with the output shaft, thereby reliably preventing the output shaft from being rotated and when it moves over the minimum stroke, the slippage between the actuator means and the link means keeps the pawl means in engagement with the output shaft with the same force. In other words, in disregard of variations in stroke of the parking mechanisms of mass-produced automatic transmission units, it is easy and reliable to place the automatic transmission into and release it from the parking range with a light operating force.

BRIEF DESCRIPTION OF THE DRAWINGS

The above and other objects and features of the present invention will be clearly understood from the following detailed description with respect to preferred embodiments thereof when considered in conjunction with the accompanying drawings, in which.

DETAILED DESCRIPTION OF THE PREFERRED EMBODIMENT

Figure 1:
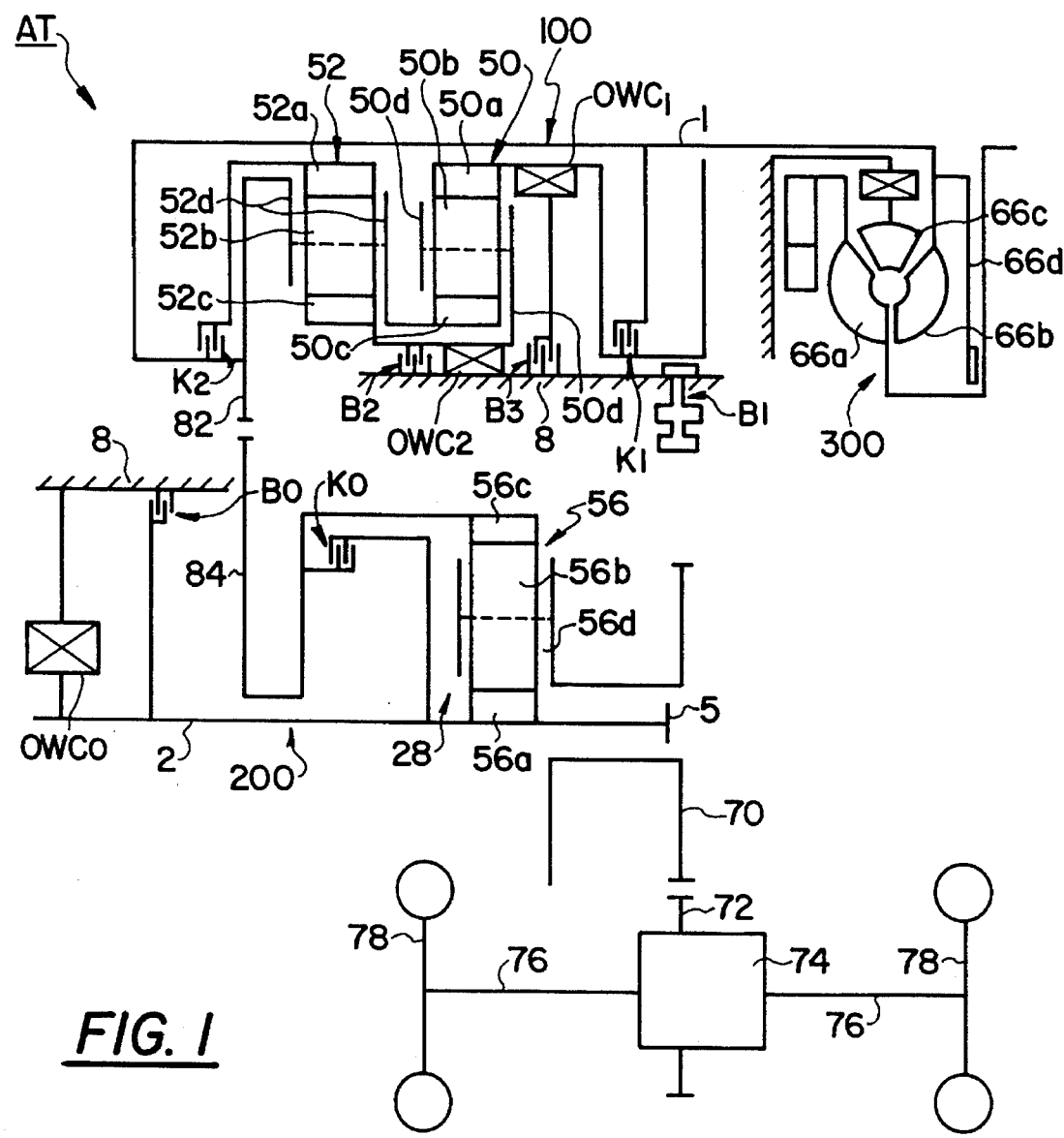
FIG. 1 is a schematic illustration of an automatic transmission in which a parking mechanism in accordance with a present invention is installed.

Referring to the drawings in detail, and, in particular, to FIG. 1, an automatic transmission 100, in which a parking mechanism in accordance with a preferred embodiment of the present invention is incorporated, is shown. This automatic transmission AT is of the type having a first or primary transmission mechanism (1st TRM) 100, a second or secondary transmission mechanism (2nd TRM) 200, and a torque converter 300. Engine output torque is transmitted to a primary transmission shaft 1 of the primary transmission mechanism 100, which serves a transmission input shaft, through the torque converter 300 and then, increased or decreased by front and rear primary transmission gear sets 50 and 52 mounted on and coaxially with the primary transmission shaft 1. The engine output torque, having been varied in the primary transmission mechanism 100, is further transmitted to the secondary transmission mechanism 200 through an engagement between a main gear 82 and a counter gear 84 and then, increased or decreased by a secondary transmission gear set 56 mounted on and coaxially with a secondary transmission shaft 2. The engine output torque transmission is finally made to a differential gear 74 through an engagement between a transmission output gear 70 and a differential input gear 72 so as to turn differentially drive wheels 78 connected to the differential gear 74 through a split drive axle 76.

Torque converter 300, which may take any type well known to those skilled in the art, has a pump impeller 66a secured to an engine output shaft (not shown), a turbine runner 66b secured to the primary transmission shaft 1, a stator 66c placed between the pump impeller 66a and the turbine runner 66b, and a lock-up piston 66d. The torque converter 300 thus configured makes engine torque transmission from the pump impeller 66a to the turbine runner 66b by the aid of a light working oil and can and does multiply engine torque. The amount of multiplication is made by means of the stator 66c depending upon a relative speed difference between the pump impeller 66a and the turbine runner 66b.

Primary transmission mechanism 100 comprises two, namely front and rear, primary planetary gear sets 50 and 52 having front and rear primary sun gears 50a and 52a, front and rear primary pinion gear 50b and 52b, and front and rear primary ring gears 50c and 52c, respectively. The primary transmission shaft 1 is coupled to and uncoupled from the front primary sun gear 50a through a first primary clutch K1. Similarly, the primary transmission shaft 1 is coupled to and uncoupled from the rear primary sun gear 52a through a second primary clutch K2. Further, the front primary sun gear 50a is locked and unlocked with respect to a transmission housing 8 through both front primary one-way clutch OWC1 and third primary brake B3 arranged in series with respect to the front primary sun gear 50a or through both front primary one-way clutch OWC1 and first primary brake B1 arranged in series with respect to the front primary sun gear 50a. The front and rear primary planetary gear sets 50 and 52 are operationally coupled through a fixed connection between a front primary pinion carrier 50d of the front primary pinion gear 50b and the rear primary ring gear 52c. The rear primary ring gear 52c is locked and unlocked with respect to the transmission housing 8 through both rear primary one-way clutch OWC2 and second primary brake B2 arranged in parallel with respect to the transmission housing 8. Further, the front and rear primary planetary gear sets 50 and 52 are operationally coupled through the front primary ring gear 50c and the rear primary pinion gear 52b via a rear primary pinion carrier 52d so as to connect the transmission of revolutions of the rear primary pinion gear 52b as output rotations from the primary transmission mechanism 100 to the secondary transmission mechanism 200.

Secondary transmission mechanism 200 comprises a single planetary gear set 56 having a secondary sun gear 56a, a secondary pinion gear 56b and a secondary ring gear 56c. The secondary transmission shaft 2, on which the secondary sun gear 56a is fixedly mounted, is locked and unlocked with respect to the transmission housing through both secondary one-way clutch OWCo and secondary brake Bo. The secondary ring gear 56c is in mesh with the counter gear 84 so as to connect the transmission of rotation from the primary transmission mechanism 100 to the secondary transmission mechanism 200 and is locked and unlocked with respect to the secondary transmission shaft 2 through a secondary clutch Ko. The secondary pinion gear 56b is fixedly connected to the transmission output gear 70 through a secondary pinion carrier 56d so as to connect the transmission of revolution of the secondary pinion gear 56b as output rotations from the automatic transmission AT to the differential gear 72.

These frictional coupling elements, i.e. the clutches K1–K3 and Ko, the brakes B1–B3 and Bo and the one-way clutches OWC1, OWC2 and OWCo, are selectively coupled and uncoupled or locked and unlocked so as to place the automatic transmission into any desired forward gears and a reverse gear as indicated in the following Table I, wherein a frictional coupling element is coupled or locked for a gear marked by a circle and a gear marked by a circle in parentheses is provided only when engine brake is available.

TABLE I

| Gear | Frictional Coupling Element | | | | | | | | | | 1st TRM | 2nd TRM |
|---|---|---|---|---|---|---|---|---|---|---|---|---|
| | Ko | K1 | K2 | Bo | B1 | B2 | B3 | OWCo | OWC1 | OWC2 | | |
| 1st Gear | | | O | (O) | | (O) | | O | | O | 1st | Low |
| 2nd Gear | O | | O | (O) | | (O) | | | | O | 1st | High |
| 3rd Gear | | | O | (O) | (O) | | O | O | O | | 2nd | Low |
| 4th Gear | | O | O | (O) | | | O | O | | | 3rd | Low |
| 5th Gear | O | O | O | | | | O | | | | 3rd | High |
| Reverse | | | O | O | | O | | O | | | 3rd | High |

Briefly describing, the primary transmission mechanism 100 is placed into any one of three forward gears, such as 1st, 2nd and 3rd gears, by selectively locking and unlocking the clutches K1 and K2. The secondary transmission mechanism 200 is changed into high and low gears by locking and unlocking the clutch Ko, respectively. In this instance, when the secondary transmission mechanism 200 is placed into the high gear by means of locking of the clutch Ko, the secondary planetary gear set 56 is mechanically locked, so as to provide a transmission ratio of 1.0. On the other hand, when it is placed into the low gear by means of unlocking of the clutch Ko, the secondary planetary gear set 56 allows relative rotation between the secondary sun gear 56a and the secondary ring gear 56c, so as to provide a transmission ratio smaller than 1.0. In this manner, in combination of the primary and secondary transmission mechanisms 100 and 200, the automatic transmission AT is potentially able to provide six forward gears. However, in this instance, it is adapted to use only five forward gears with the exclusion of the combination of the 2nd gear of the primary transmission mechanism 100 and the high gear of the secondary transmission mechanism.

Figure 2:
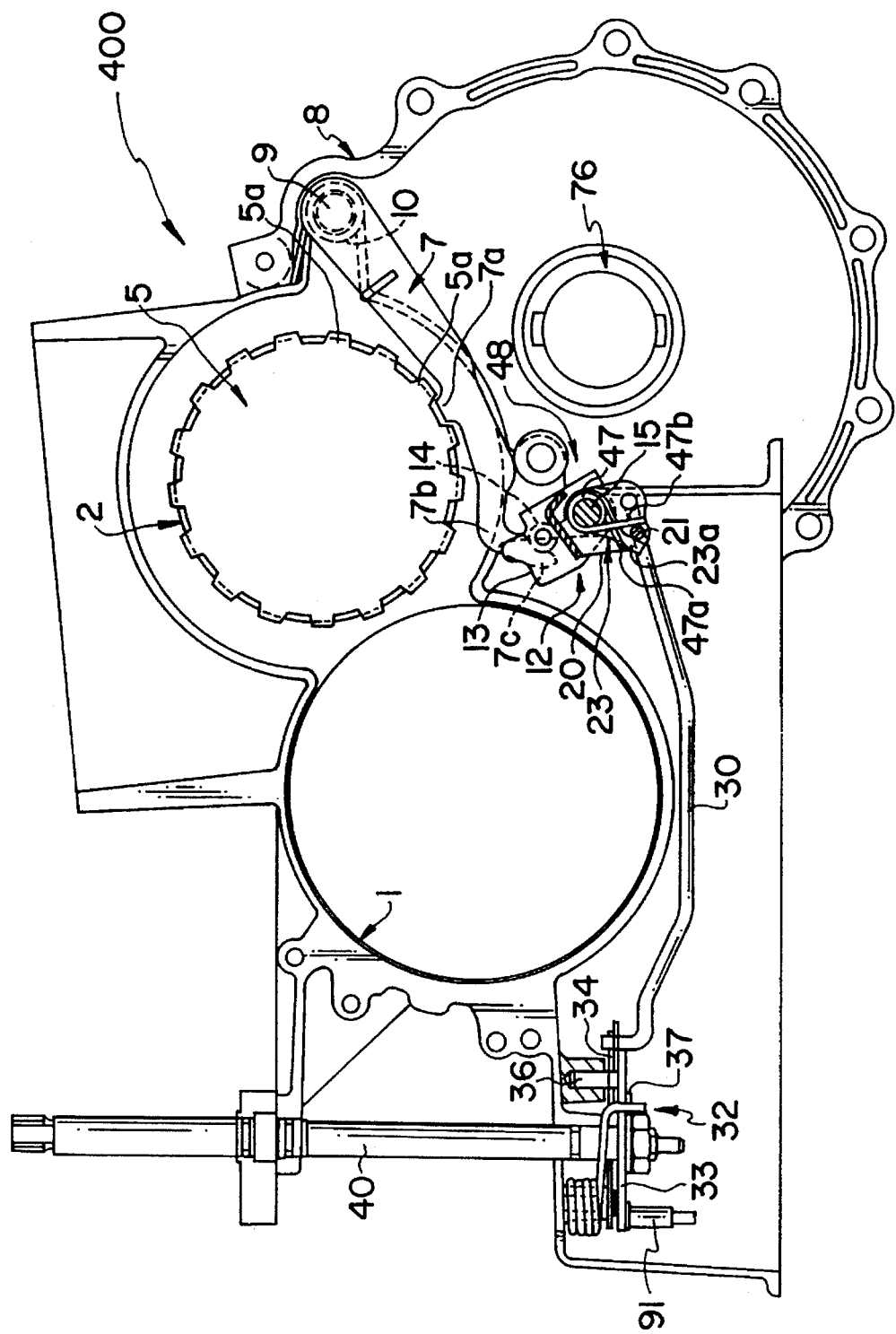
FIG. 2 is a side view of the parking mechanism in accordance with a preferred embodiment of the present invention.

Referring to FIG. 2, the automatic transmission AT has a practical layout such that the secondary transmission shaft 2 is located off the upper rear of the drive axle 76, and the drive axle 76 is located off the lower rear of the secondary transmission shaft 2. A parking mechanism 400, provided so as to cooperate with the secondary transmission shaft 2, has a parking gear 5 fixedly attached to the secondary transmission shaft 2 and a parking anchor arm 7 pivoted for swing movement on a pivot shaft 9 and extends in a direction perpendicular to the secondary transmission shaft 2. This parking anchor arm 7 is formed at its middle with a pawl 7a engageable with teeth 5a of the parking gear 5 and has a bent end portion 7b with a tip end 7c extending downward. The parking mechanism 400 further has a return spring 10 provided between the parking anchor arm 7 and the pivot shaft 9 so as to urge the parking anchor arm 7 away from the parking gear 5.

Figure 3:
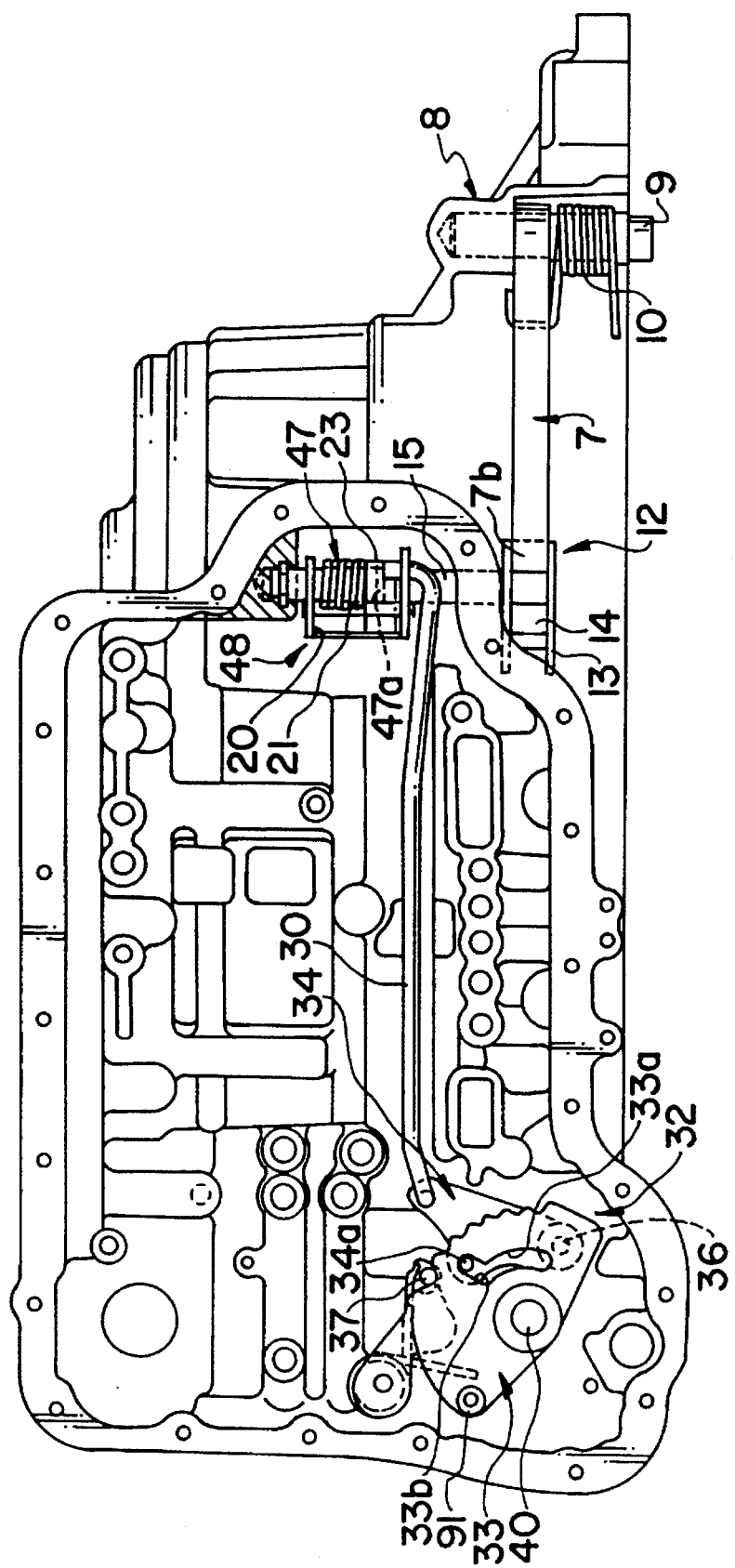
FIG. 3 is a bottom view of FIG. 2 with a part broken away.
Figure 4:
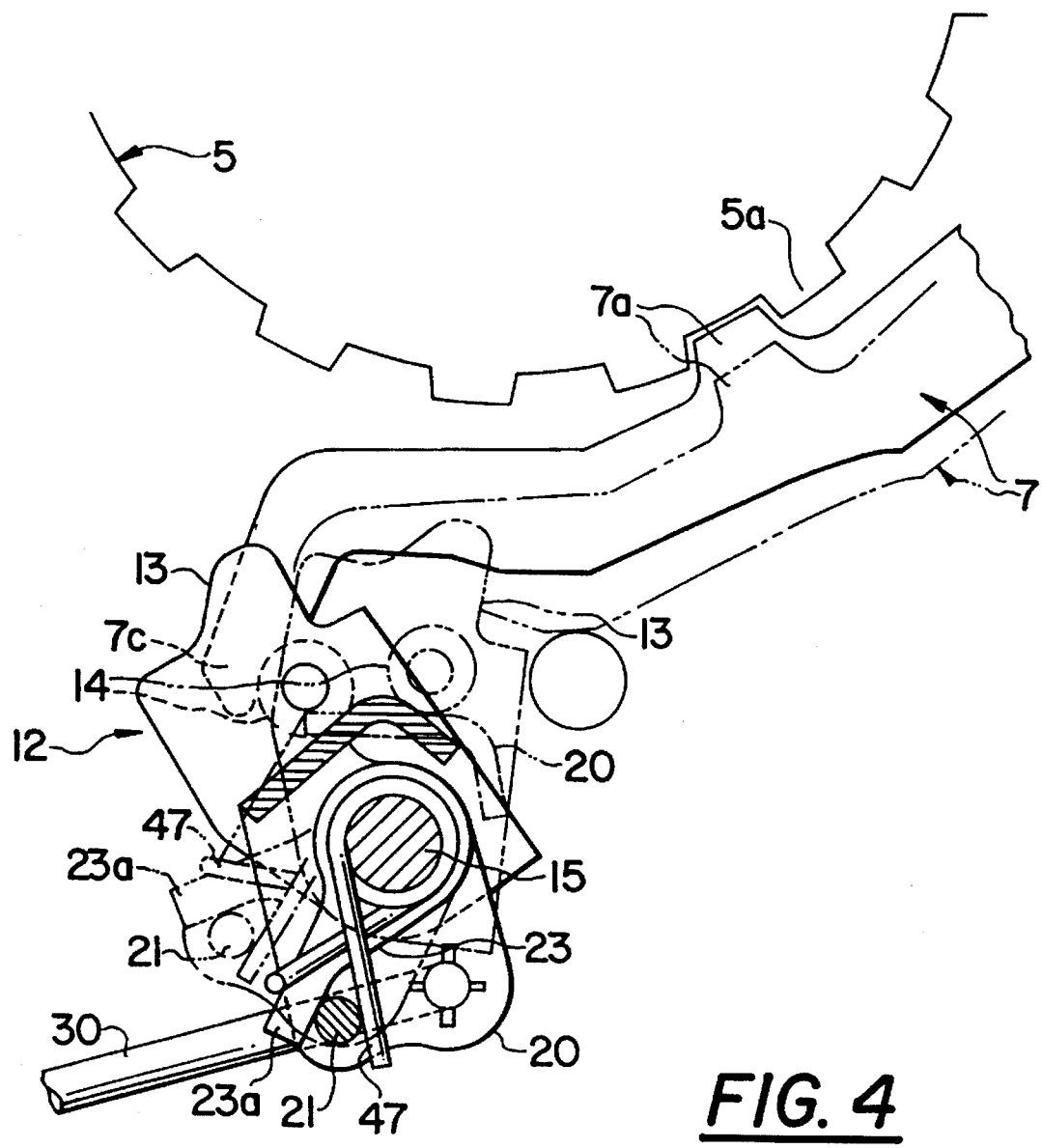
FIG. 4 is a operational explanatory view of the essential part of the parking mechanism.

Referring to FIGS. 3 and 4, the parking mechanism 400 has a parking anchor actuator assembly 12 located below the bent end portion 7b of the parking anchor arm 7. This parking anchor actuator assembly 12 is comprised of a pair of guide members 13 disposed on opposite sides of the parking anchor arm 7 in the axial direction of each transmission shaft, a hollow cylindrical roller 14, located below the bent end portion 7b of the parking anchor arm 7, which extends between and is secured to the pair of guide members 13, and a support rod 15 supported for rotation by the transmission housing 8 for fixedly supporting the pair of guide members 13. As will be described later, the tip end 7c of the parking anchor arm 7 is placed in the course of counterclockwise movement of the hollow cylindrical roller 14 of the parking anchor actuator assembly 12.

As shown in detail in FIG. 4, when the support rod 15 turns in an counterclockwise direction as viewed in FIG. 4, the guide members 13 and the hollow cylindrical roller 14 turn in the same direction, so that the cylindrical roller 14 is brought into contact with the bent end portion 7b of the parking anchor arm 7 and pushes it upward, thereby forcing the parking anchor arm 7 to turn in the clockwise direction around the pivot shaft 9. As a result, the parking anchor arm 7 brings its pawl 7a into engagement with the teeth 5a of the parking gear 5 so as to prevent rotation of the secondary transmission shaft 2. The parking anchor actuator assembly 12 cooperates with a slip mechanism 48, mounted on the support rod 15, which will be described in detail later.

Slip mechanism 48 is linked to a cam mechanism 32 with an actuator tie rod 30. This cam mechanism 32 has a sector blade 33, which is secured to a distal end of a shift lever connecting shaft 40 vertically extending and operationally coupled to a transmission shift or select lever (not shown) operated by the driver, and a generally T-shaped parking assist lever 34, which is supported at its one end for rotation by the transmission housing 8 through a pivot shaft 36 and is connected at its other end to the actuator tie rod 30. This sector blade 33 has a saw-tooth shaped periphery which is engaged by a click ball 37 urged by a coil spring 50 and is formed with an circular arcuate cam slot 33a with its center at a center axis of the shift lever connecting shaft 40 and a straight cam slot 33b continuously extending from the circular arcuate cam slot 33a radially outward. In this instance, the saw-tooth shaped periphery has a plurality of teeth assigned to selectable ranges, respectively. A cam follower pin 34a secured to the step portion of the generally T-shaped parking assist lever 34 is received and slides in these slots 33a and 33b. A rod 91 secured to the sector blade 33 is provided to operate a manual valve of a hydraulic control circuit in accordance with a selection of transmission shift lever by the driver.

Selecting or shifting the automatic transmission AT to the parking range by the transmission shift lever causes the shift lever connecting shaft 40, and hence the sector blade 33, in the clockwise direction as viewed in FIG. 3, until the tooth assigned to the parking range of the sector blade 33 is engaged by the click ball 37. Incidentally, the connected pin 34a is forced to get out of the circular arcuate cam slot 34a and come into the straight cam slot 34b. As a result, the parking assist lever 34 is turned in the counterclockwise direction, as viewed in FIG. 3, about the pivot shaft 36, so as to shift the actuator tie rod 30 toward the parking anchor actuator assembly 12. When the actuator tie rod 30 is moved with a minimum distance or stroke toward the support rod 15 of the parking anchor actuator assembly 12, the cylindrical roller 14 pushes the bent end portion 7b upward, turning the parking anchor arm 7 in the clockwise direction about the pivot shaft 9 until the pawl 7a of the anchor arm 7 is brought into engagement with the tooth 5a of the parking gear 5. After the engagement of the pawl 7a with the tooth 5a, since a further counterclockwise turn of the cylindrical roller 14 of the parking anchor actuator assembly 12 is restricted by the tip end 7c of the parking anchor arm 7, the actuator tie rod 30 is prevented from further moving in the same direction over the minimum stroke or distance. In this instance, the term "minimum distance" as used herein shall mean and refer to the distance by which the actuator tie rod 30 moves without operational variations when the cam mechanism 32 and elements or parts related to and cooperating with it operate satisfactorily in accordance with the design specification.

Slip mechanism 48, which is disposed above the parking anchor actuator assembly 12, has a pair of guide members 20 mounted for rotation on the support rod 15 of the parking anchor actuator assembly 12 with a separation, a cylindrical connection pin 21 disposed between and connecting lower portions of the guide members 20 together, and a generally square-shaped link plate 23 formed with an downward extending lower extension 23a is provided between the guide members 20 and secured to the support rod 15 of the parking anchor actuator assembly 12. The slip mechanism 48 further has a coil spring 47 mounted on the support rod 15 of the parking anchor actuator assembly 12. The coil spring 47 is formed with end extensions 47a and 47b extending tangentially with respect to the support rod 15 and spatially intersecting. These end extensions 47a and 47b of the coil spring 47b, are engaged with the lower extension 23a of the link plate 23 and the connection pin 21, respectively so as to urge the lower extension 23a of the link plate 23 to bring into contact with the connection pin 21. This slip mechanism 48 is operationally linked to the actuator tie rod 30 through one of the guide members 20.

With this slip mechanism 48, when the cylindrical roller 14 of the parking anchor actuator assembly 12 is in contact with and restricted in counterclockwise turning by the tip end 7c of the parking anchor arm 7, the guide members 20 of the slip mechanism 48 are disabled to turn, so that, a further movement of the actuator tie rod 30 over the minimum stroke is accompanied by a counterclockwise turn of the guide members 20. This counterclockwise turn of the guide members 20 causes the connection pin 21 to be separated away from the lower extension 23a of the link plate 23, compressively charging a restoring force in the slip spring 47. In such a way, the actuator tie rod 30 is allowed to move over the minimum stroke, slipping relative to the parking anchor actuator assembly 12.

As apparent from the above, with the parking mechanism for an automatic transmission in accordance with the present invention, in disregard of operational variations in the stroke with which the actuator tie rod 30 moves if the cam mechanism 32 and elements or parts related to and cooperating with it have large cumulative allowable errors, when, on one hand, the actuator tie rod 30 actually moves with the minimum stroke, the slip mechanism 48 operates all together as one whole without allowing relative slippage or displacement between the guide members 20 and the link plate 23 held coupled together by the coil spring 47 and when, on the other hand, it moves over the minimum stroke, the slip mechanism 48 allows relative slippage or displacement between the guide members 20 and the link plate 23. This results in that when the actuator tie rod 30 moves only with the minimum stroke, the cylindrical roller 14 of the parking anchor actuator assembly 12 pushes the bent end portion 7b of the anchor arm 7 upward, so as to bring the pawl 7a of the anchor arm 7 into engagement with the teeth 5a of the parking gear 5, thereby reliably preventing the secondary transmission shaft 2 from being rotated and when the actuator tie rod 30 moves over the minimum stroke, the slippage of the guide members 20 relative to the link plate 23 keeps the anchor arm 7 in engagement with the teeth 5a of the parking gear 5 with the same force. In other words, in disregard of variations in stroke of the actuator tie rods 30 of mass-produced automatic transmission units, it is easy and reliable to place the automatic transmission into and release it from the parking range with a light operating force.

In the parking mechanism for an automatic transmission in accordance with the present invention, because the slippage of the guide members 20 slip relative to the link plate 23, which is caused due to an over stroke of the actuator tie rods 30, is governed only by means of the compression of the coil spring 47, the parking mechanism is configured and adjusted simply in mechanical structure in spite of variations in stroke of the actuator tie rods 30 of mass-produced automatic transmissions. Furthermore, because the positional selection of the cylindrical roller 14 of the parking anchor actuator assembly 12 is easy even in the layout where the cam mechanism 32 linked to the shift lever connecting shaft 40 and the parking anchor actuator assembly 12 cooperating with the slip mechanism 48 are disposed separately away from each other on opposite sides of the primary transmission shaft 1 and are connected by the long actuator tie rod 30, reliable parking operation and lightly releasing operation is realized in the parking mechanism of the mass-produced automatic transmission.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. A parking mechanism for an automatic transmission, having a primary shaft and a secondary shaft which transmits engine output torque to an output shaft of a power train placed in parallel with said secondary shaft, said parking mechanism comprising:

anchor means capable of engaging with the secondary shaft for disabling the output shaft to rotate and disengaging from the secondary shaft for enabling the output shaft to rotate;

actuator means disposed on one side of the primary shaft close to the secondary shaft and on a straight line extending between axes of rotation of the primary shaft and the output shaft for bringing the anchor means into engagement with the secondary shaft; and range selection means disposed on another side of the primary shaft remote from the secondary shaft for connecting a range selecting operation by a driver to the actuator means so as to cause the actuator means to bring the anchor means into engagement with the secondary shaft upon a selection of a parking range by the range selection means.

2. A parking mechanism as defined in claim 1, wherein the anchor means comprises a pivoted anchor arm and a pawl formed integrally with the anchor arm, the pawl being brought into engagement with the secondary shaft from below the secondary shaft.

3. A parking mechanism as defined in claim 2, wherein the range selection means includes a linking rod for causing a pivotal movement of the actuator means through which the pivoted anchor arm is turned so as to bring the pawl into engagement with the secondary shaft.

4. A parking mechanism as defined in claim 3, wherein the secondary shaft is placed above the primary shaft and the output shaft.

5. A parking mechanism as defined in claim 4, wherein the linking rod is placed below a straight line extending between axes of rotation of the primary shaft and the output shaft.

6. A parking mechanism as defined in claim 2, wherein the secondary shaft is placed above the primary shaft and the output shaft.

7. A parking mechanism for an automatic transmission having an input shaft and an output shaft placed in parallel, said parking mechanism comprising:

anchor means capable of engaging with the output shaft for disabling the output shaft to rotate and disengaging from the output shaft for enabling the output shaft to rotate;

actuator means disposed on one side of the input shaft close to the output shaft for bringing the anchor means into engagement with the output shaft;

range selection means disposed on another side of the input shaft remote from the output shaft for connecting a range selecting operation by a driver to the actuator means so as to cause a pivotal movement of the actuator means to bring the anchor means into engagement with the output shaft upon a selection of a parking range;

restraint means for restraining the pivotal movement of the actuator means beyond a predetermined extent which is essential to bring the anchor means into engagement with the output shaft; and slip means disposed between the range selection means and the actuator means for allowing slippage between the range selection means and the actuator means during a restraint of the actuator means by the restraint means.

8. A parking mechanism as defined in claim 7, wherein the anchor means includes a pivoted anchor arm and a pawl integrally formed with the pivoted anchor arm, the pawl being brought into engagement with the output shaft from below the output shaft.

9. A parking mechanism as defined in claim 8, wherein the range selecting means includes a linking rod for causing a pivotal movement of the actuator means through which the pivoted anchor arm is turned so as to bring the pawl into engagement with the output shaft.

10. A parking mechanism as defined in claim 9, wherein the actuator means includes a pivoted actuator member supported so as to cause a pivotal movement by the range selection means, the pivoted actuator member being held in contact with the pivoted anchor arm during a selection of a parking range by the range selection means.

11. A parking mechanism as defined in claim 10, wherein the restraint means comprise an end extension formed integral with a free end portion of the pivoted anchor arm so as to engage with the pivoted actuator member when a predetermined extent of pivotal movement of the pivoted actuator member occurs.

12. A parking mechanism as defined in claim 9, wherein said slip means comprises a pivoted slip member connected to the linking rod and urging means for urging the pivoted slip member and the pivoted actuator member so as to mechanically couple them together until the pivoted actuator member becomes restrained by the restraint means and allow slippage between them charging a restoring force after the predetermined extent of pivotal movement of the pivoted actuator member.

13. A parking mechanism as defined in claim 12, wherein the urging means comprises a coil spring disposed between the pivoted slip member and the pivoted actuator member.

14. A parking mechanism for an automatic transmission having a transmission shaft, said parking mechanism comprising:

anchor means capable of engaging with the transmission shaft for disabling the transmission shaft to rotate and disengaging from the transmission shaft for enabling the transmission shaft to rotate;

actuator means for bringing the anchor means into engagement with the transmission shaft;

range selection means for connecting a range selecting operation by a driver to the actuator means so as to cause a pivotal movement of the actuator means to bring the anchor means into engagement with the transmission shaft upon a selection of a parking range;

restraint means for restraining the pivotal movement of the actuator means beyond a predetermined extent which is essential to bring the anchor means into engagement with the transmission shaft; and slip means disposed between the range selection means and the actuator means for allowing slippage between the range selection means and the actuator means during a restraint of the actuator means by the restraint means.

15. A parking mechanism as defined in claim 14, wherein the anchor means includes a pivoted anchor arm and a pawl integrally formed with the pivoted anchor arm, the pawl being brought into engagement with the transmission shaft from below the transmission shaft.

16. A parking mechanism as defined in claim 15, wherein the range selecting means includes a linking rod for causing a pivotal movement of the actuator means through which the pivoted anchor arm is turned so as to bring the pawl into engagement with the transmission shaft.

17. A parking mechanism as defined in claim 16, wherein the actuator means includes a pivoted actuator member supported so as to cause a pivotal movement by the range selection means, the pivoted actuator member being held in contact with the pivoted anchor arm during a selection of a parking range by the range selection means.

18. A parking mechanism as defined in claim 17, wherein the restraint means comprise an end extension formed integral with a free end portion of the pivoted anchor arm so as to engage with the pivoted actuator member when a predetermined extent of pivotal movement of the pivoted actuator member occurs.

19. A parking mechanism as defined in claim 16, wherein said slip means comprises a pivoted slip member connected to the linking rod and urging means for urging the pivoted slip member and the pivoted actuator member so as to mechanically couple them together until the pivoted actuator member becomes restrained by the restraint means and allow slippage between them charging a restoring force after the predetermined extent of pivotal movement of the pivoted actuator member.

20. A parking mechanism as defined in claim 19, wherein the urging means comprises a coil spring disposed between the pivoted slip member and the pivoted actuator member.

* * * * *